(12) United States Patent
Tenny et al.

(10) Patent No.: US 10,149,213 B2
(45) Date of Patent: Dec. 4, 2018

(54) GROUP HANDOVER METHODS AND SYSTEMS

(71) Applicant: Futurewei Technologies, Inc., Plano, TX (US)

(72) Inventors: Nathan Edward Tenny, Poway, CA (US); Haibo Xu, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/676,158

(22) Filed: Aug. 14, 2017

(65) Prior Publication Data
US 2018/0279188 A1 Sep. 27, 2018

Related U.S. Application Data

(60) Provisional application No. 62/475,723, filed on Mar. 23, 2017.

(51) Int. Cl.
| | |
|---|---|
| *H04W 36/00* | (2009.01) |
| *H04W 8/18* | (2009.01) |
| *H04B 7/26* | (2006.01) |
| *H04W 4/08* | (2009.01) |

(52) U.S. Cl.
CPC ....... *H04W 36/0083* (2013.01); *H04W 8/186* (2013.01); *H04W 36/0016* (2013.01); *H04W 36/0055* (2013.01); *H04B 7/2606* (2013.01); *H04W 4/08* (2013.01)

(58) Field of Classification Search
CPC ....... H04W 88/06; H04W 88/18; H04W 8/08; H04W 36/0055; H04W 76/046; H04W 92/20; H04W 12/06

USPC ............ 455/411, 452.2, 46, 437, 418, 422.1, 455/552.1, 132.3, 435.1, 450, 438, 442, 455/436
See application file for complete search history.

(56) References Cited

U.S. PATENT DOCUMENTS

| | | | |
|---|---|---|---|
| 2009/0270099 A1* | 10/2009 | Gallagher | H04W 8/08 455/435.1 |
| 2011/0275359 A1* | 11/2011 | Sebire | H04L 5/001 455/422.1 |
| 2012/0003962 A1 | 1/2012 | Jeon et al. | |
| 2012/0155377 A1 | 6/2012 | Chai | |
| 2012/0252355 A1 | 10/2012 | Huang et al. | |
| 2013/0114446 A1* | 5/2013 | Liu | H04W 24/10 370/252 |
| 2014/0369198 A1* | 12/2014 | Rinne | H04W 40/02 370/235 |

(Continued)

FOREIGN PATENT DOCUMENTS

| | | |
|---|---|---|
| CN | 102006639 A | 4/2011 |
| WO | 2014053183 A1 | 4/2014 |

*Primary Examiner* — Joseph Arevalo
(74) *Attorney, Agent, or Firm* — Slater Matsil, LLP

(57) ABSTRACT

A method and system for group handover is provided. In an embodiment, a method in a network component for group handover in a wireless network includes receiving, at the network component, a mobility command from a target base station. The method also includes processing, with the network component, the mobility command in a packet data convergence protocol (PDCP) layer of a context for a remote user equipment (UE) to generate a PDCP Protocol Data Unit (PDU). The method also includes encapsulating the PDCP PDU as a field in a radio resource control (RRC) message to the relay UE.

28 Claims, 7 Drawing Sheets

(56) References Cited

U.S. PATENT DOCUMENTS

| | | | |
|---|---|---|---|
| 2015/0173118 A1* | 6/2015 | Gholmieh | H04W 76/02 |
| | | | 455/436 |
| 2016/0066241 A1* | 3/2016 | Wu | H04W 36/28 |
| | | | 370/331 |
| 2016/0192269 A1* | 6/2016 | Kim | H04W 36/30 |
| | | | 370/332 |
| 2016/0212661 A1* | 7/2016 | Basu Mallick | H04L 1/1614 |
| 2016/0270108 A1* | 9/2016 | Dinan | H04L 69/22 |
| 2016/0278073 A1* | 9/2016 | Dinan | H04W 48/08 |
| 2016/0285716 A1* | 9/2016 | Pelletier | H04L 5/0098 |
| 2016/0309424 A1* | 10/2016 | Dinan | H04W 52/365 |
| 2017/0318458 A1* | 11/2017 | Laselva | H04L 9/14 |
| 2017/0331577 A1* | 11/2017 | Parkvall | H04J 11/0079 |
| 2017/0331670 A1* | 11/2017 | Parkvall | H04J 11/0079 |

\* cited by examiner

GROUP HANDOVER METHODS AND SYSTEMS

This application claims priority to U.S. Provisional Application Ser. No. 62/475,723, filed on Mar. 23, 2017, titled "Group Handover Methods and Systems," which application is hereby incorporated by reference in its entirety.

TECHNICAL FIELD

The present disclosure relates generally to a system and method handover in wireless networks, and, in particular embodiments, to a system and method for group handover.

BACKGROUND

FIG. 1 is a block diagram of protocol stacks for a control plane 100 for layer 2 (L2) user equipment (UE)-to-Network relaying. The L2 UE-to-Network Relaying feature studied in 3GPP Rel-15 allows a "relay UE" to serve as a link to the network for one or more "remote UEs", according to the protocol stacks shown in FIG. 1.

So-called "group handover" is a natural optimization to reduce over the air signaling when a relay, serving one or more remote UEs, goes through handover. "Group handover" also helps to synchronize the handover procedures, so that race conditions do not occur between the relay handover and the remote handovers. One message (Group Handover Command) from the network to the relay UE results in separate handover commands being sent to all the remote UEs. The message may also include the handover command for the relay UE itself.

Group handover creates some complexities around the handling of the Packet Data Convergence Protocol (PDCP) layer. The handover command for each remote UE needs to be a complete Radio Resource Control (RRC) message, encrypted according to the security configuration of that remote UE. These already encrypted messages need to be delivered to the relay UE at substantially the same time as relay UE's own handover command, e.g., as Protocol Data Units (PDUs) inside an RRC message of the relay UE. Such an RRC message of the relay UE may carry the handover command for the relay UE as well as the PDUs for any remote UEs served by the relay UE. However, the basic relaying architecture cannot cause this to happen. A PDCP PDU processed for one remote UE would always be sent directly from the evolved Node B (eNB) to the relay, for forwarding to that remote UE. Therefore, it is desirable to provide a new system and method to enable the group handover.

SUMMARY

In an embodiment, a method in a network component for group handover in a wireless network includes receiving, at the network component, a mobility command from a target base station. The method also includes processing, with the network component, the mobility command in a packet data convergence protocol (PDCP) layer of a context for a remote user equipment (UE) to generate a PDCP Protocol Data Unit (PDU). The method also includes encapsulating the PDCP PDU as a field in a radio resource control (RRC) message to a relay UE.

In an embodiment, the method also includes transmitting the RRC message to the relay UE. In an embodiment, the network component is one of an eNodeB (eNB) or a gNodeB (gNB). In an embodiment, the remote UE is a wearable device (WD).

In an embodiment, a method in a relay user equipment (UE) for group handover in a wireless network includes receiving, from a source base station, a radio resource control (RRC) message. The RRC message includes a packet data convergence protocol (PDCP) protocol data unit (PDU) for a remote UE. The PDCP PDU is encapsulated as a field in an RRC message formulated by an RRC layer of a context for the relay UE. The method also includes extracting the PDCP PDU from the RRC message. The method also includes passing the PDCP PDU to an uppermost layer of a short range link protocol stack on a short range link that serves the remote UE.

In an embodiment, the relay UE indicates to the remote UE that the PDCP PDU includes a mobility command for the remote UE. In an embodiment, the method also includes suspending forwarding of additional PDCP PDUs to the remote UE until the handover is completed since the relay UE assumes that the remote UE is now in the midst of a handover procedure. The method also includes performing a handover by the relay UE. The method also includes resuming forwarding the additional PDCP PDUs to the remote UE upon completion of the handover by the relay UE. The method also includes receiving a handover complete message from the remote UE. The method also includes forwarding the handover complete message to a target base station.

In an embodiment, a network component for group handover in a wireless network includes a transmitter, a receiver, a processor; and a computer readable storage medium storing programming for execution by the processor. The programming includes instructions for receiving, at the network component, a mobility command from a target base station. The programming also includes instructions for processing, with the network component, the mobility command in a packet data convergence protocol (PDCP) layer of a context for a remote user equipment (UE). The programming also includes instructions for processing, with the network component, the mobility command in a packet data convergence protocol (PDCP) layer of a context for a remote user equipment (UE) to generate a PDCP Protocol Data Unit (PDU). The programming also includes instructions for encapsulating the PDCP PDU as a field in a radio resource control (RRC) message to a relay UE.

In an embodiment, a relay user equipment (UE) for group handover in a wireless network includes a transmitter, a receiver, a processor; and a computer readable storage medium storing programming for execution by the processor. The programming includes instructions for receiving, from a source base station, a radio resource control (RRC) message comprising a packet data convergence protocol (PDCP) protocol data unit (PDU) for a remote UE. The PDCP PDU is encapsulated as a field in an RRC message formulated by an RRC layer of a context for the relay UE. The programming also includes instructions for extracting the PDCP PDU from the RRC message. The programming also includes instructions for passing the PDCP PDU to an uppermost layer of a short range link protocol stack on a short range link that serves the remote UE.

In an embodiment, a non-transitory computer-readable medium is provided. The non-transitory computer readable medium stores computer instructions for instructing a relay user equipment (UE) to perform a group handover in a wireless network, that when executed by one or more processors, cause the one or more processors to perform receiving, at the network component, a mobility command from a target base station. The instructions, when executed by the one or more processors, also cause the one or more processors to perform processing, with the network component, the mobility command in a packet data convergence protocol (PDCP) layer of a context for a remote user equipment (UE) to generate a PDCP Protocol Data Unit (PDU). The instructions, when executed by the one or more processors, also cause the one or more processors to perform encapsulating the PDCP PDU as a field in an RRC message to a relay UE.

In an embodiment, a non-transitory computer-readable medium is provided. The non-transitory computer readable medium stores computer instructions for performing group handover in a wireless network, that when executed by one or more processors, cause the one or more processors to perform receiving, from a source base station, a radio resource control (RRC) message comprising a packet data convergence protocol (PDCP) protocol data unit (PDU) for a remote UE. The PDCP PDU is encapsulated as a field in an RRC message formulated by an RRC layer of a context for the relay UE. The instructions, when executed by the one or more processors, also cause the one or more processors to perform extracting the PDCP PDU from the RRC message. The instructions, when executed by the one or more processors, also cause the one or more processors to perform passing the PDCP PDU to an uppermost layer of a short range link protocol stack on a short range link that serves the remote UE.

Optionally, in any of the preceding aspects, the method or programming includes transmitting the RRC message to the relay UE.

Optionally, in any of the preceding aspects, the network component comprises one of an eNodeB (eNB) or a gNodeB (gNB).

Optionally, in any of the preceding aspects, the remote UE comprises a wearable device (WD).

Optionally, in any of the preceding aspects, the RRC message comprises a transparent container.

Optionally, in any of the preceding aspects, the relay UE indicates to the remote UE that the PDCP PDU comprises a mobility command for the remote UE.

Optionally, in any of the preceding aspects, the method or programming further includes suspending forwarding of additional PDCP PDUs to the remote UE; performing a handover by the relay UE; and resuming forwarding of the additional PDCP PDUs to the remote UE upon completion of the handover by the relay UE.

Optionally, in any of the preceding aspects, the method or programming further includes receiving a handover complete message from the remote UE and forwarding the handover complete message to a target base station.

An advantage of an embodiment is the enablement of group handovers. A further advantage of an embodiment is that the handover command for each remote UE is a complete Radio Resource Control (RRC) message, encrypted according to the security configuration of that remote UE. A further advantage of an embodiment is that these already encrypted messages are delivered to the relay UE at the same time as relay UE's own handover command.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The structure, manufacture and use of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosed methods, systems, and devices, and do not limit the scope.

Disclosed herein are methods and system for enabling group handover in wireless network. In an embodiment, a serving eNB or gNB (gNB is the name of the base station in 5G) receives a configuration for a remote UE from a target eNB or gNB and processes this configuration as an RRC message for a remote UE through PDCP and then passes the PDCP PDU(s) to the context of a relay UE. The relay UE's context formulates an RRC message containing the PDCP PDU(s) as encapsulated fields and sends that message to the relay UE. The relay UE extracts the PDCP PDUs and passes them directly to the adaptation layer on the short range link. The remote UE will see them as forwarded PDCP PDUs and will decrypt them and then assemble them into the original configuration, in the form of an RRC message directed to the remote UE.

Figure 1:
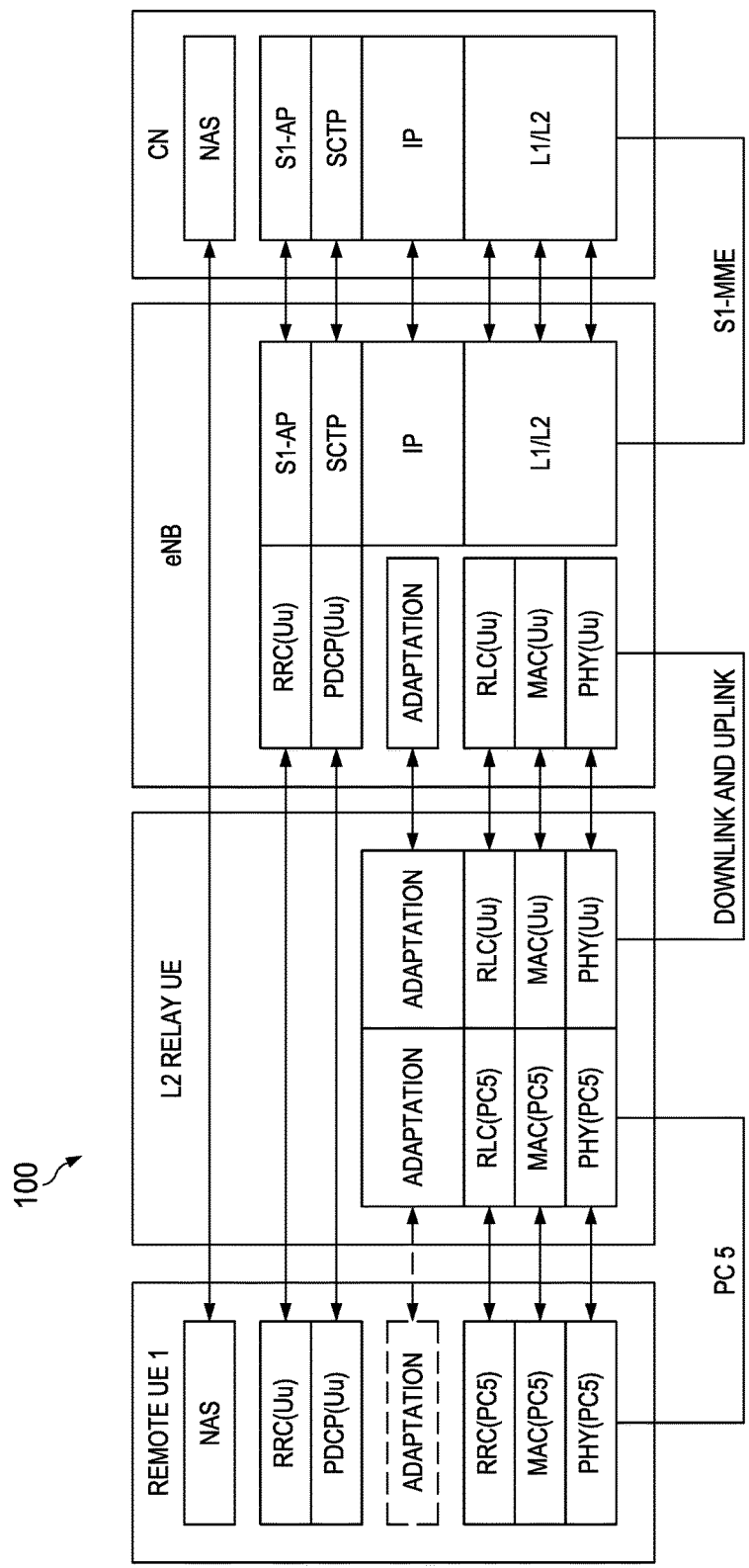
FIG. 1 is a block diagram of a control plane protocol stack for L2 UE-to-Network relaying.
Figure 2:
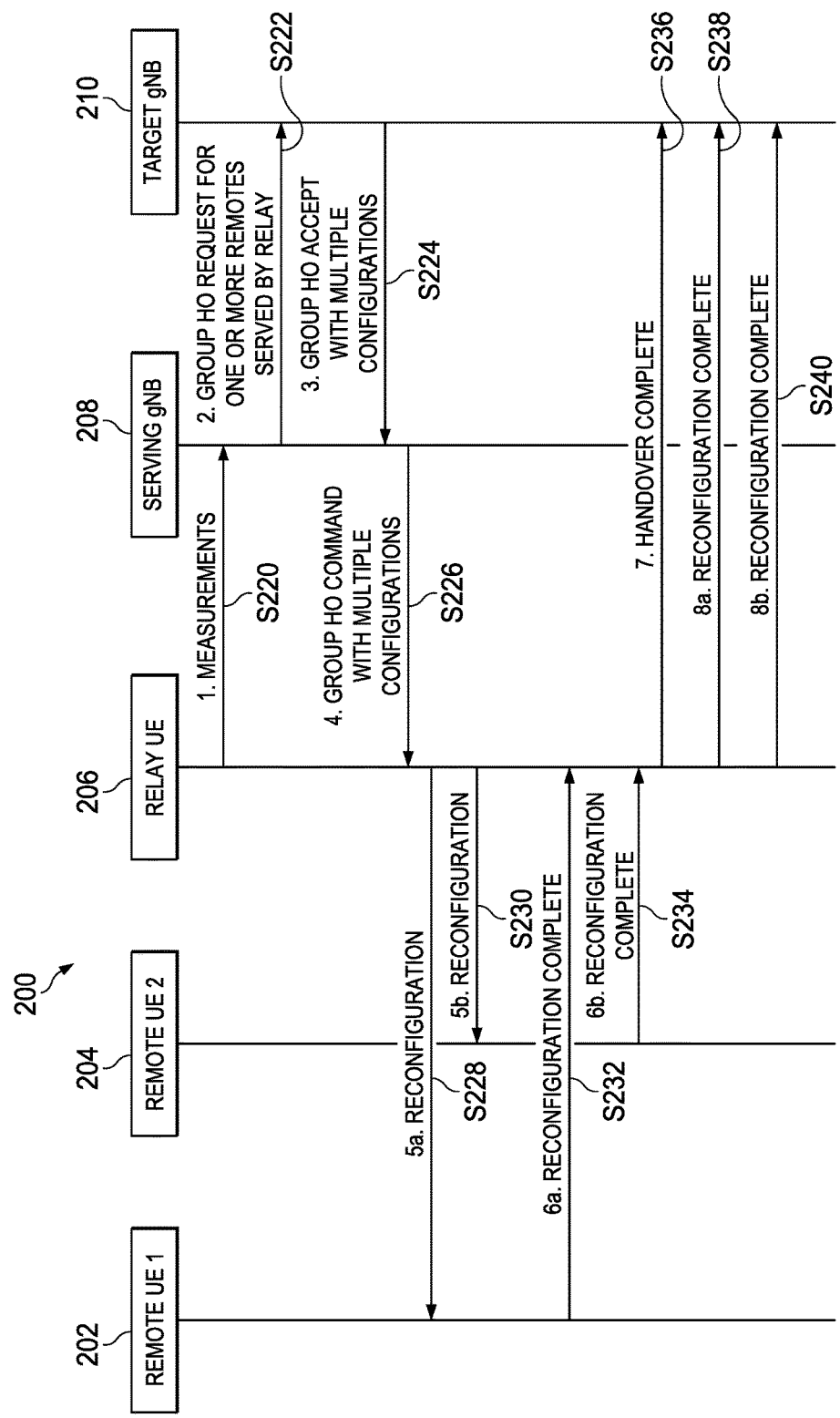
FIG. 2 is a diagram of an embodiment method for group handover.

FIG. 2 is a diagram of an embodiment method for group handover. The method 200 includes messages passed between two remote UEs (remote UE1 202 and remote UE2 204), a relay UE 206, a serving eNB 208, and a target eNB 210. As an example, consider a relay UE 206 serving two wearable devices (remote UE1 202 and remote UE2 204). When handover is triggered for the relay UE 206, the network sends a single group handover command that contains the mobility instructions for the relay UE 206 and one or both remote UE1 202 and remote UE2 204. An example message flow is as follows. At step 1 S220, the relay UE 206 makes measurements of the channel quality and sends the measurements to the serving eNB 208. At step 2 S222, the serving eNB 208 sends a group handover (HO) request for one or more remotes served by the relay UE 206 to the target eNB 210. In the depicted example, all remotes receive a group HO request. However, in other embodiments, only one of the two receives a HO request. At step 3 S224, the target eNB 210 sends a group HO accept message with multiple configurations to the serving eNB 208. The multiple configurations may comprise a configuration for the relay UE 206 and for at least one of the remote UEs. If both remote UE1 202 and remote UE2 204 are to be handed over, the multiple configurations may comprise a configuration for relay UE 206, a configuration for remote UE1 202, and a configuration for remote UE2 204. The serving eNB 208 processes the configuration for each remote UE (e.g., remote UE1 202 and remote UE2 204) as an RRC message through PDCP and then passes the resulting PDCP PDU(s) to the context of the relay UE 206. At step 4 S226, the serving eNB 208 sends the group HO command with multiple configurations to the relay UE 206. The multiple configurations in the group HO command may comprise the PDCP PDUs produced by processing the configuration for one of the remote UEs, together with a configuration for the relay UE 206 itself. The configuration for the relay UE 206 is processed in a PDCP layer of a context of the relay UE 206. The configuration for remote UE1 202 is encapsulated in an RRC message for the relay UE 206. The configuration for remote UE2 204 is encapsulated in an RRC message for the relay UE 206. All of the configurations (the configuration for the relay UE 206 and the configurations for the remote UEs 202, 204) are all passed from the serving eNB 208 to the relay UE 206 in a single message with the configurations for the remote UEs 202, 204 encapsulated separately from the configuration for the relay UE 206. At steps 5a S228 and 5b S230, the relay UE 206 extracts the encrypted configuration information for each of the remote UEs 202, 204 and transmits the respective encrypted configuration information in a PDCP PDU format to the corresponding remote UEs 202, 204. The relay UE 206 does not decrypt the encrypted reconfiguration information destined for the remote UEs 202, 204, but merely extracts the encrypted configuration information from the RRC message. At steps 6a S232 and 6b S234, the remote UEs 202, 204 each transmit a reconfiguration complete message to the relay UE 206. At step 7 S236, the relay UE 206 transmits a handover complete message to the target eNB 210. At steps 8a S238 and 8b S240, the relay UE 206 forwards the reconfiguration complete messages from the remote UEs 202, 204 to the target eNB 210. Note, the forwarding of the reconfiguration complete messages to the target eNB 210 may be delayed by the relay UE 206 until after it has completed the handover to avoid the reconfiguration complete messages from being transmitted to the wrong eNB. Also, note that the process is transparent from the perspective of the remote UEs 202, 204. To these entities, the process does not appear any different than any other handover process. Similarly, to the target eNB 210, the completion of the handover process does not appear any different than the completion of any other handover process; the target eNB 210 receives reconfiguration complete messages from the remote UEs 202, 204 in the same manner as completing an ordinary (non-group) handover procedure.

Figure 3:
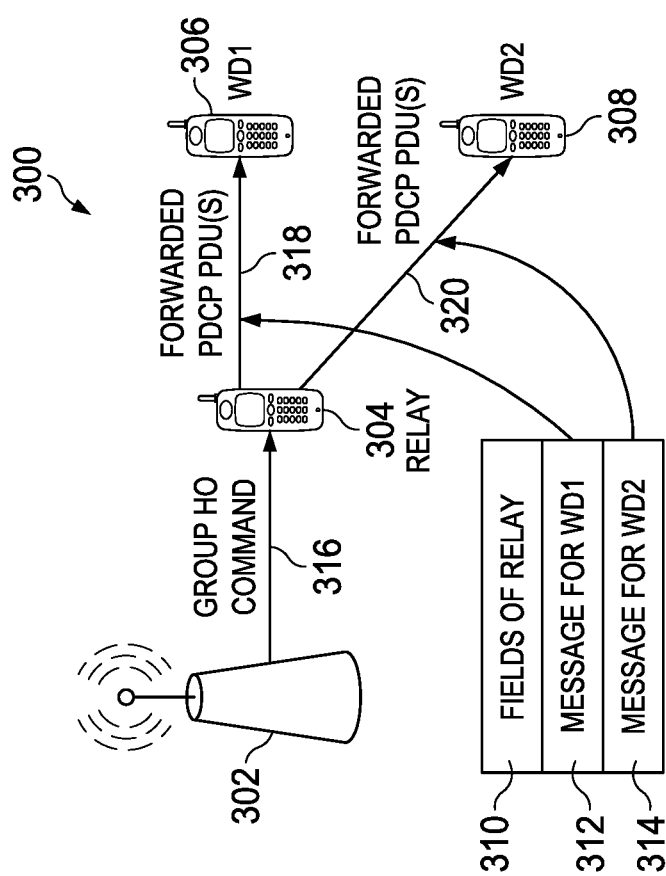
FIG. 3 is a diagram of an embodiment system for group handover.

FIG. 3 is a diagram of an embodiment system 300 for group handover. The system 300 includes an eNB 302, a relay UE 304, and two wearable devices (WDs) 306, 308. The wearable devices 306, 308 are remote UEs. The eNB 302 sends a group HO command 316 to the relay UE 304. The group HO command 316 includes fields 310 for the relay 304, a message 312 for the WD1 306 and a message 314 for the WD2 308. The messages 312, 314 for the WDs 306, 308 may be encapsulated as PDCP PDUs in the group HO command 316. The relay UE 304 reconfigures itself according to the information in the fields 310 for the relay UE 304. The reconfiguring may comprise taking part in a handover procedure. The relay UE 304 forwards the message 312 for the WM. 306 in one or more PDCP PDUs 318 to WD1 306. The relay UE 304 forwards the message 314 for the WD2 308 in one or more PDCP PDUs 320 to the WD2 308. In an embodiment, the reconfiguration message 312, 314 for each WD 306, 308 is encrypted with the security context belonging to the respective WD 306, 308. This means that the reconfiguration message 312, 314 is processed by the PDCP context for the respective WD 306, 308 in the eNB 302. The reconfiguration message 312, 314 is generated by the target eNB (not shown) as an RRC PDU and passed to the source eNB 302 for PDCP processing. The reconfiguration messages 312, 314 are "bundled" together in a message to the relay 304 and separately forwarded by the relay 304 to the respective WDs 306, 308 as described above and as shown in FIG. 3.

Figure 4:
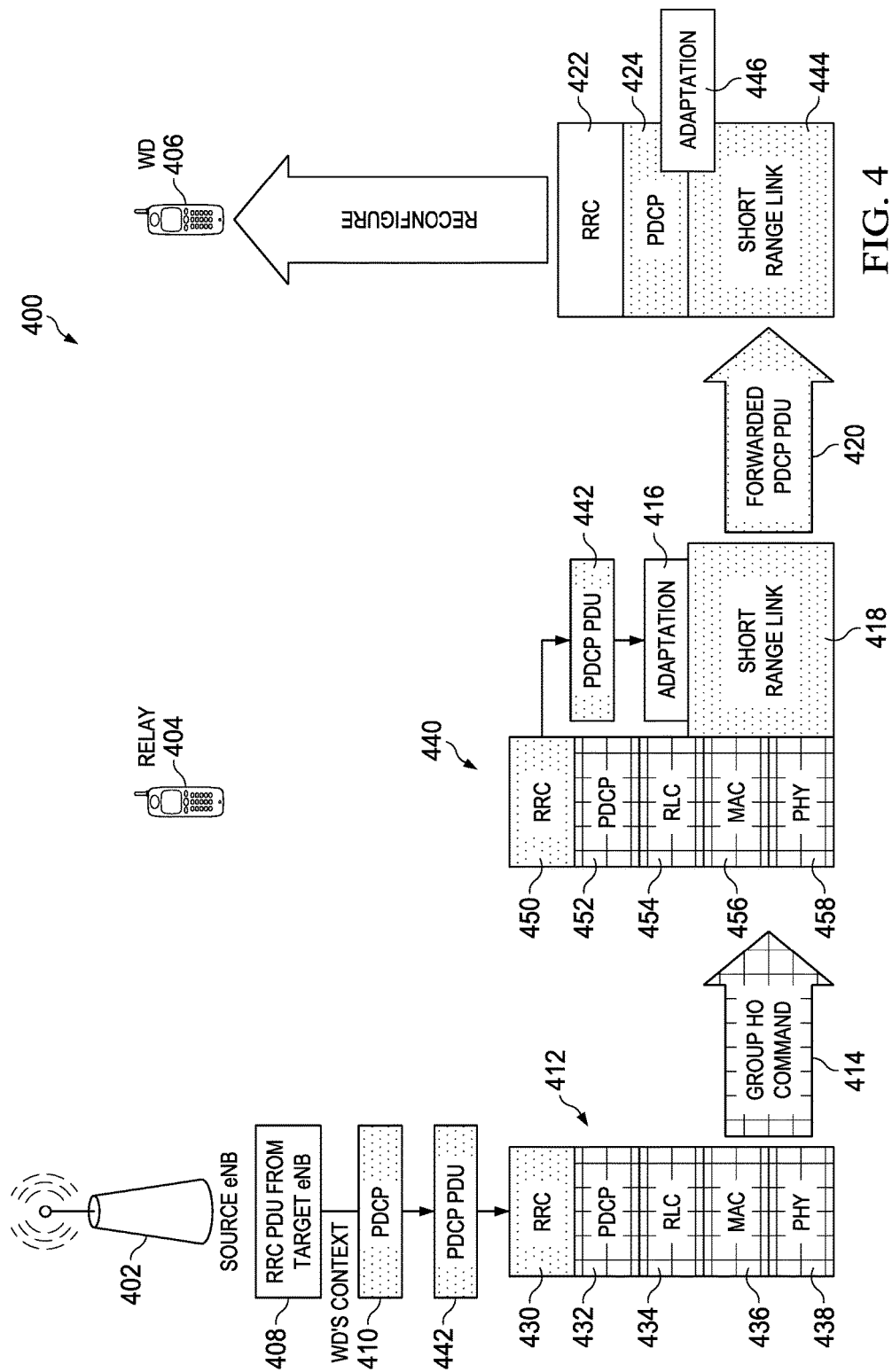
FIG. 4 is a diagram of an embodiment system for group handover.

FIG. 4 is a diagram of an embodiment system 400 for group handover. The system 400 includes a source eNB 402, a relay UE 404, and a WD 406. FIG. 4 shows the flow of a reconfiguration message from the source eNB 402 through the relay 404 to the WD 406 (which may be one of multiple WDs served by the system), including the protocol stacks that process the reconfiguration message in each node. During processing in the blocks of the protocol stacks with horizontal and vertical cross hatching, the reconfiguration message is inside a container encrypted with the relay UE's key. The container may be, for example, a field of an RRC message that is directed to the relay and encrypted with the relay UE's key. During processing in the blocks with dotted shading, the reconfiguration message is only encrypted with the WD's key. Note, the group HO command itself is not indicated to the relay UE 404 as being for forwarding to the WD 406. Rather, the group HO command is processed by the relay UE 404 as its own RRC message.

The source eNB 402 receives an RRC PDU 408 from a target eNB (not shown), processes the RRC PDU 408 through the PDCP layer 410 in the WD's context, and passes the result to the RRC layer 430 of the relay UE's context for further processing. The eNB 402 encapsulates the resulting PDCP PDU 442 as a field in an RRC message to the relay UE. In various implementations, encapsulation is a process that takes a body of data that may have its own internal structure (e.g., the delivered PDCP PDU, which contains an encoded RRC message that has been processed by a PDCP layer) and inserts that body of data into a "container" structure such that the internal structure of the data is not evident to a layer responsible for processing the container structure. The "container" structure may be referred to as a transparent container. The "container" structure is processed further by a protocol stack 412 of the relay UE's context in the source eNB 402. The protocol stack 412 includes an RRC layer 430, a PDCP layer 432, a Radio Link Control (RLC) layer 434, a Medium Access Control (MAC) layer 436, and a Physical (PHY) layer 438. RRC layer 430 formulates the group handover command message and passes it to PDCP layer 432. The RRC entity in the relay UE's context may package the PDCP PDU as a "blob" in the group handover command message. Further processing of the group handover command message in the eNB proceeds as normal. In particular, PDCP layer 432 encrypts the group handover command using a security key associated with relay UE 404. Note, the target eNB (not shown) has minimal impact. In an embodiment, it only has to provide the reconfiguration commands in the group handover accept message. The reconfiguration commands may be provided as RRC PDUs encapsulated in the group handover accept message.

The group HO command 414 is sent to the relay UE 404 and processed through a protocol stack 440 including an RRC layer 450, a PDCP layer 452, an RLC layer 454, a MAC layer 456, and a PHY layer 458. The layers of protocol stack 440 in the relay UE are in correspondence with the layers of protocol stack 412 in the source eNB. The data processed by the PDCP layer 432, RLC layer 434, MAC layer 436, and PHY layer 438 are encrypted with the relay UE's key. PDCP layer 452 decrypts the group HO command 414 using the relay UE's key and passes the decrypted message to RRC layer 450. RRC layer 430 recognizes the group handover command 414 for special treatment. The PDCP PDU 442 destined for WD 406 is extracted from the message and passed directly to a layer of the short range link's protocol stack 418. In an embodiment, this is the adaptation layer 416. If there is no adaptation layer 416 on the short range link 418, the PDCP PDU is passed directly as an SDU to the top layer of the short range link's transport stack (e.g., an RLC layer of $PC_5$, or a PDCP layer of $PC_5$ in the case in which the PDCP is implemented on $PC_5$). In an embodiment, the PDCP PDU is passed to the uppermost layer of the short range link protocol stack on a short range link 418 that serves the WD 406. In an embodiment, the PDCP PDU can be clarified as being a mobility command for the WD 406. The extracted PDCP PDU 420 for the WD 406 is forwarded to the WD 406. The PDCP PDU 420 is processed by a protocol stack in the WD 406. The protocol stack in the WD includes an RRC layer 422, a PDCP layer 424, and additional layers 444 of a short range link. The protocol stack may also include an adaptation layer 446. During processing by the short range link layers 444, the optional adaptation layer 446, and the PDCP layer 424, the PDCP PDU 420 may be encrypted according to a security key associated with the WD 406. The RRC layer 422 processes an RRC PDU constructed by the PDCP layer 424 from the PDCP PDU 420. The PDCP layer 424 decrypts the PDCP PDU 420 using the WD's security key. The RRC PDU may be unencrypted. The RRC PDU may comprise a mobility command for processing by the WD 406. The mobility command may comprise a reconfiguration message.

In an embodiment, the relay UE 404 delays forwarding uplink messages of the remote UEs (e.g., the WD 406) until after the relay UE 404 completes its own handover. Otherwise, there is a risk that the handover complete messages from the remote UEs (e.g., the WD 406) could go to the source eNB 402 by mistake. After the relay UE 404 completes its own handover the relay UE 404 resumes forwarding the messages of the remote UEs (e.g., WD 406).

The WD 406 receives the forwarded PDCP PDU 420 in the short range link and extracts and decodes the configuration information. The WD 406 reconfigures itself according to the configuration information and sends a reconfiguration complete message to the relay UE 404. The operation of reconfiguring itself comprises taking part in a handover procedure to the target eNB. The relay UE 404 receives the reconfiguration complete message and forwards it to the target eNB.

Figure 5:
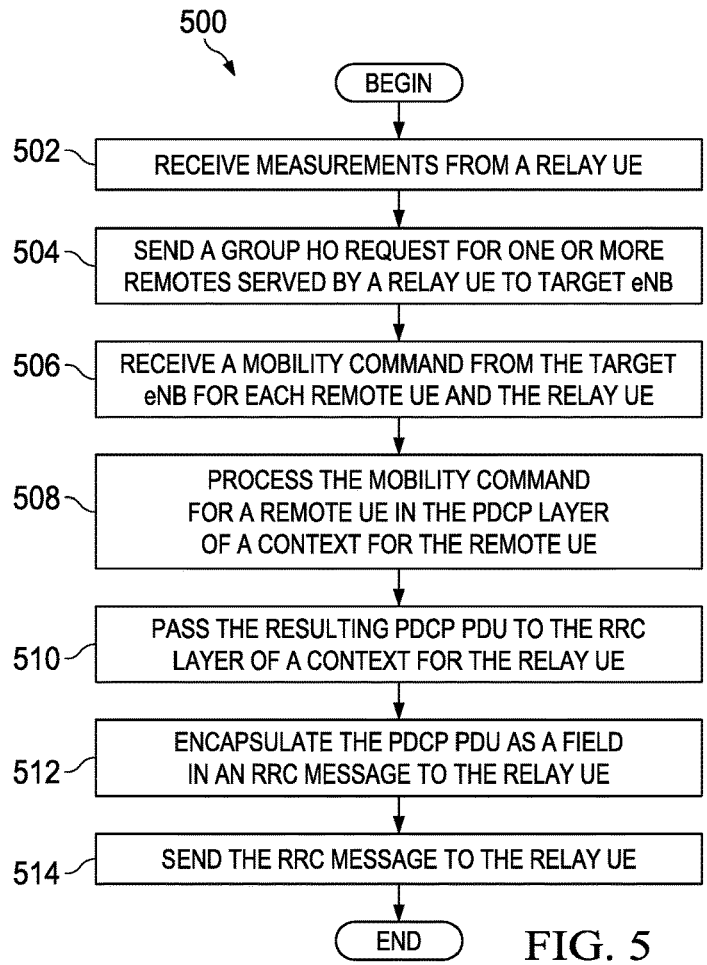
FIG. 5 is a flowchart illustrating an embodiment of a method in an eNB for group handover.

FIG. 5 is a flowchart illustrating an embodiment of a method 500 in an eNB for group handover. The method 500 begins at block 502 where a source eNB receives measurements from a relay UE. At block 504, the source eNB sends a group HO request for one or more remote UEs served by the relay UE to a target eNB. At block 506, the source eNB receives a mobility command from the target eNB for each remote UE and the relay UE. At block 508, the source eNB processes the mobility command for a remote UE in the PDCP layer of a context for the remote UE. Block 508 may be repeated for one or more additional remote UEs served by the relay UE. At block 510, the source eNB passes the resulting PDCP PDU for each remote UE to the RRC layer of a context for the relay UE. At block 512, the source eNB encapsulates the PDCP PDU(s) as a field(s) in an RRC message to the relay UE. Blocks 508, 510, and 512 are repeated for each of the one or more remote UEs served by the relay UE. At block 514, the source eNB sends the RRC message to the relay UE, after which, the method 500 may end.

Figure 6:
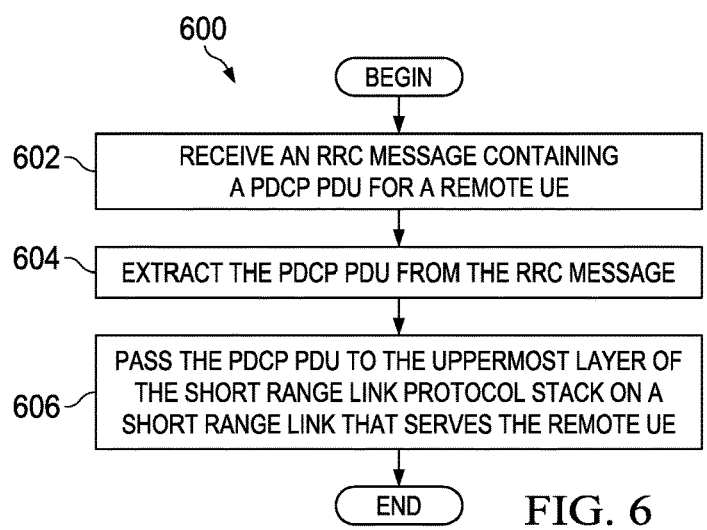
FIG. 6 is a flowchart illustrating an embodiment of a method in a relay UE for group handover.

FIG. 6 is a flowchart illustrating an embodiment of a method 600 in a relay UE for group handover. The method 600 begins at block 602 where a relay UE receives an RRC message containing a PDCP PDU(s) for a remote UE(s) from a source eNB. At block 604, the relay UE extracts the PDCP PDU(s) from the RRC message. At block 606, the relay UE passes the PDCP PDU to the uppermost layer of the short range link protocol stack on a short range link that serves the respective remote UE, after which, the method may end.

Figure 7:
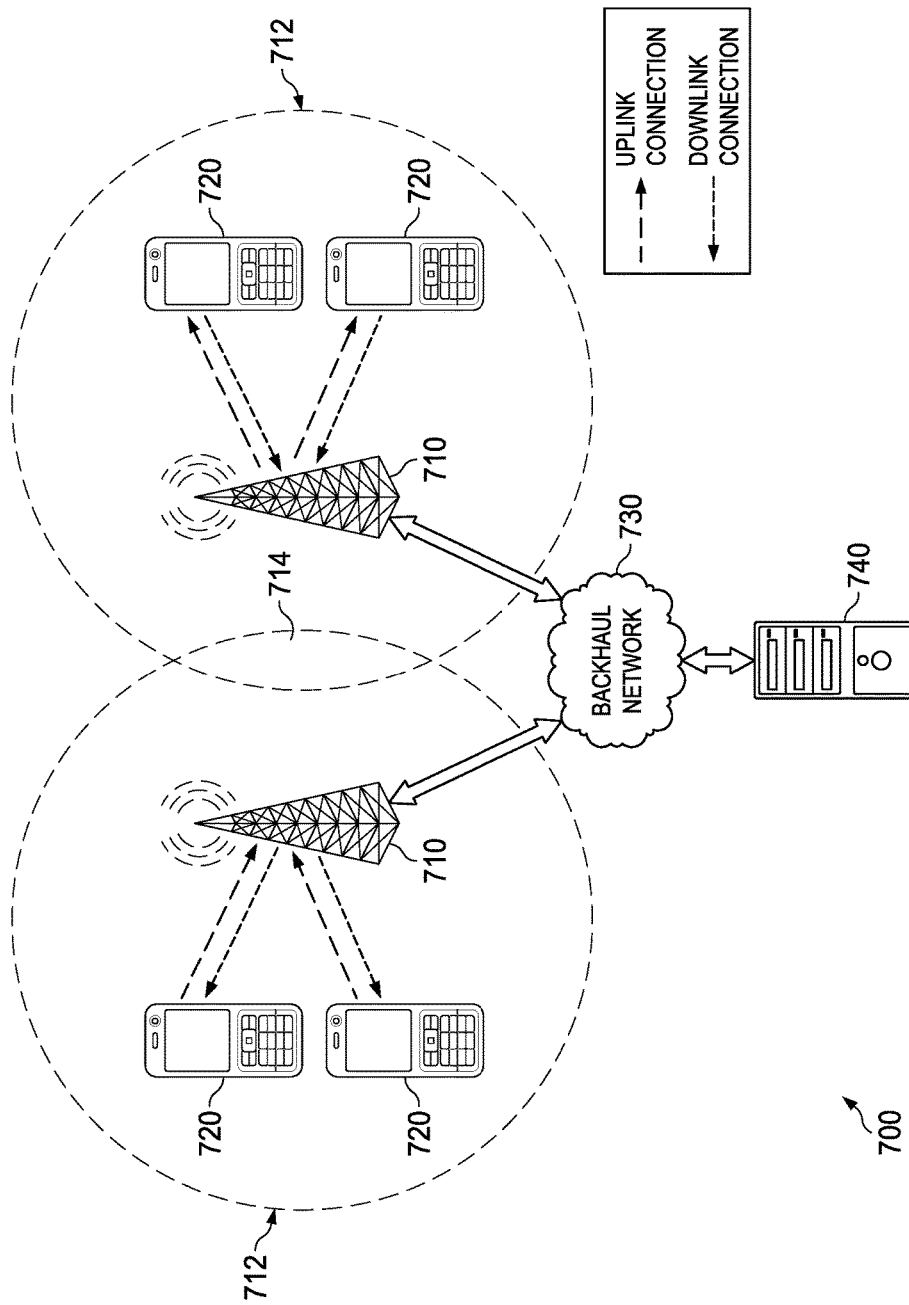
FIG. 7 illustrates a network for communicating data.

FIG. 7 illustrates a network 700 for communicating data. The network 700 comprises a plurality of access points (APs) 710 each having a coverage area 712, a plurality of user equipment (UEs) 720, a backhaul network 730, and a media server 740. As used herein, the term AP may also be referred to as a transmission point (TP), a base station (BS), a base transceiver station (BTS), an eNodeB (eNB), or a gNodeB (gNB), and the terms may be used interchangeably throughout this disclosure. These coverage areas represent the range of each AP 710 to adequately transmit data, and the coverage areas of adjacent APs 710 may have some overlap 714 in order to accommodate handoffs between APs 710 whenever a UE 720 exits one coverage area 712 and enters an adjacent coverage area 712. The AP 710 may comprise any component capable of providing wireless access by, inter alia, establishing uplink (dashed line) and/or downlink (dotted line) connections with the UEs 720, such as a BTS, an eNB, a gNB, a femtocell, and other wirelessly enabled devices. The UEs 720 may comprise any component capable of establishing a wireless connection with the AP 710. For example, the UE 720 may be a smartphone, a laptop computer, a tablet computer, a wireless telephone, etc. The UEs 720 may also be referred to as wireless devices, mobile devices, or wireless mobile devices. The backhaul network 730 may be any component or collection of components that allow data to be exchanged between the AP 710 and a remote end (not shown). In some embodiments, the network 700 may comprise various other wireless devices, such as relays, femtocells, etc.

Figure 8:
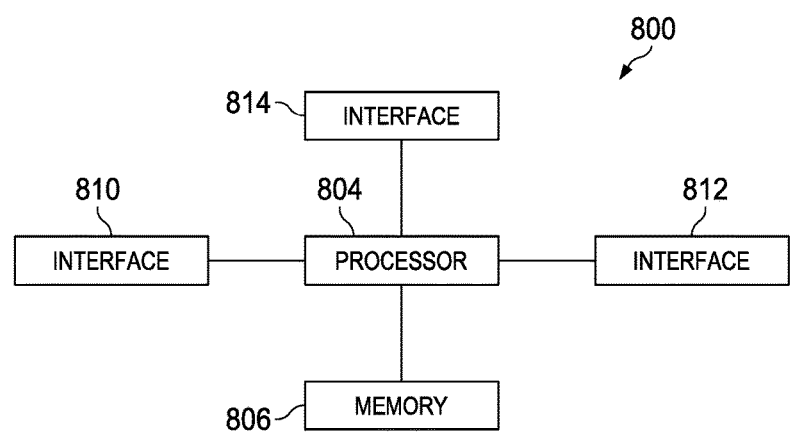
FIG. 8 illustrates a block diagram of an embodiment processing system for performing methods described herein, which may be installed in a host device.

FIG. 8 illustrates a block diagram of an embodiment processing system 800 for performing methods described herein, which may be installed in a host device. As shown, the processing system 800 includes a processor 804, a memory 806, and interfaces 810, 812, 814, which may (or may not) be arranged as shown in FIG. 8. The processor 804 may be any component or collection of components adapted to perform computations and/or other processing related tasks, and the memory 806 may be any component or collection of components adapted to store programming and/or instructions for execution by the processor 804. In an embodiment, the memory 806 includes a non-transitory computer readable medium. The interfaces 810, 812, 814 may be any component or collection of components that allow the processing system 800 to communicate with other devices/components and/or a user. For example, one or more of the interfaces 810, 812, 814 may be adapted to communicate data, control, or management messages from the processor 804 to applications installed on the host device and/or a remote device. As another example, one or more of the interfaces 810, 812, 814 may be adapted to allow a user or user device (e.g., personal computer (PC), etc.) to interact/communicate with the processing system 800. The processing system 800 may include additional components not depicted in FIG. 8, such as long term storage (e.g., non-volatile memory, etc.).

In some embodiments, the processing system 800 is included in a network device that is accessing, or part otherwise of, a telecommunications network. In one example, the processing system 800 is in a network-side device in a wireless or wireline telecommunications network, such as a base station, a relay station, a scheduler, a controller, a gateway, a router, an applications server, or any other device in the telecommunications network. In other embodiments, the processing system 800 is in a user-side device accessing a wireless or wireline telecommunications network, such as a mobile station, a UE, a PC, a tablet, a wearable communications device (e.g., a smartwatch, etc.), or any other device adapted to access a telecommunications network.

In some embodiments, one or more of the interfaces 810, 812, 814 connects the processing system 800 to a transceiver adapted to transmit and receive signaling over the telecommunications network.

Figure 9:
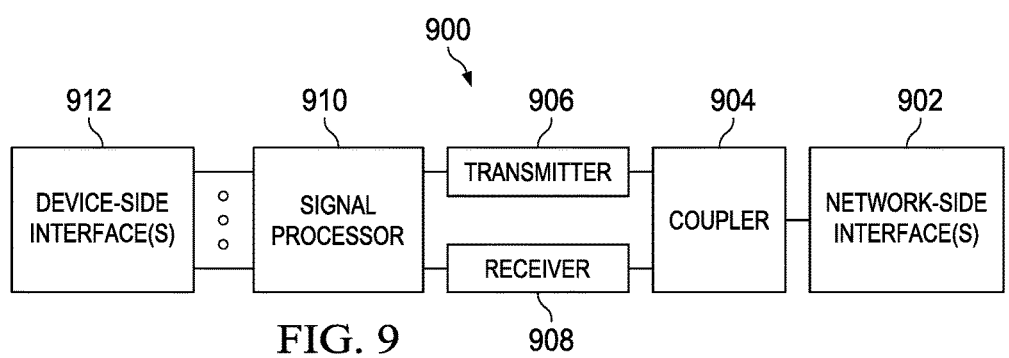
FIG. 9 illustrates a block diagram of a transceiver adapted to transmit and receive signaling over a telecommunications network.

FIG. 9 illustrates a block diagram of a transceiver 900 adapted to transmit and receive signaling over a telecommunications network. The transceiver 900 may be installed in a host device. As shown, the transceiver 900 comprises a network-side interface 902, a coupler 904, a transmitter 906, a receiver 908, a signal processor 910, and a device-side interface 912. The network-side interface 902 may include any component or collection of components adapted to transmit or receive signaling over a wireless or wireline telecommunications network. The coupler 904 may include any component or collection of components adapted to facilitate bi-directional communication over the network-side interface 902. The transmitter 906 may include any component or collection of components (e.g., up-converter, power amplifier, etc.) adapted to convert a baseband signal into a modulated carrier signal suitable for transmission over the network-side interface 902. The receiver 908 may include any component or collection of components (e.g., down-converter, low noise amplifier, etc.) adapted to convert a carrier signal received over the network-side interface 902 into a baseband signal. The signal processor 910 may include any component or collection of components adapted to convert a baseband signal into a data signal suitable for communication over the device-side interface(s) 912, or vice-versa. The device-side interface(s) 912 may include any component or collection of components adapted to communicate data-signals between the signal processor 910 and components within the host device (e.g., the processing system 800, local area network (LAN) ports, etc.).

The transceiver 900 may transmit and receive signaling over any type of communications medium. In some embodiments, the transceiver 900 transmits and receives signaling over a wireless medium. For example, the transceiver 900 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 902 comprises one or more antenna/radiating elements. For example, the network-side interface 902 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 900 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

In an embodiment, a method in a network component for group handover in a wireless network includes receiving, at the network component, a mobility command from a target base station. The method also includes processing, with the network component, the mobility command in a PDCP layer of a context for a remote UE to generate a PDCP PDU. The method also includes encapsulating the PDCP PDU as a field in a RRC message to the relay UE.

In an embodiment, the method also includes transmitting the RRC message to the relay UE. In an embodiment, the network component is one of an eNB or a gNB. In an embodiment, the remote UE is a WD.

In an embodiment, a method in a relay UE for group handover in a wireless network includes receiving, from a source base station, a RRC message. The RRC message includes a PDCP PDU for a remote UE. The PDCP PDU is encapsulated as a field in a RRC message formulated by an RRC layer of a context for the relay UE. The method also includes extracting the PDCP PDU from the RRC message. The method also includes passing the PDCP PDU to an uppermost layer of a short range link protocol stack on a short range link that serves the remote UE.

In an embodiment, the relay UE indicates to the remote UE that the PDCP PDU includes a mobility command for the remote UE. In an embodiment, the method also includes suspending forwarding further PDCP PDUs to the remote UE. The method also includes performing a handover by the relay UE. The method also includes resuming forwarding PDCP PDUs to the remote UE upon completion of the handover by the relay UE. The method also includes receiving a handover complete message from the remote UE. The method also includes forwarding the handover complete message to a target base station.

In an embodiment, a network component for group handover in a wireless network includes a transmitter, a receiver, a processor; and a computer readable storage medium storing programming for execution by the processor. The programming includes instructions for receiving, at the network component, a mobility command from a target base station. The programming also includes instructions for processing, with the network component, the mobility command in a PDCP layer of a context for a remote UE. The programming also includes instructions for passing a resulting PDCP PDU as a field in a RRC message formulated by an RRC layer of a context for a relay UE. The programming also includes instructions for encapsulating the PDCP PDU as a field in an RRC message to the relay UE.

In an embodiment, a relay UE for group handover in a wireless network includes a transmitter, a receiver, a processor; and a computer readable storage medium storing programming for execution by the processor. The programming includes instructions for receiving, from a source base station, a RRC message comprising a PDCP PDU for a remote UE. The PDCP PDU is encapsulated as a field in an RRC message formulated by an RRC layer of a context for the relay UE. The programming also includes instructions for extracting the PDCP PDU from the RRC message. The programming also includes instructions for passing the PDCP PDU to an uppermost layer of a short range link protocol stack on a short range link that serves the remote UE.

In an embodiment, a non-transitory computer-readable medium storing computer instructions for instructing a relay UE to perform a group handover in a wireless network, that when executed by one or more processors, cause the one or more processors to perform receiving, at the network component, a mobility command from a target base station. The instructions, when executed by the one or more processors, also cause the one or more processors to perform processing, with the network component, the mobility command in a PDCP layer of a context for a remote UE. The instructions, when executed by the one or more processors, also cause the one or more processors to perform passing a resulting PDCP PDU as a field in a RRC message formulated by an RRC layer of a context for a relay UE. The instructions, when executed by the one or more processors, also cause the one or more processors to perform encapsulating the PDCP PDU as a field in an RRC message to the relay UE.

In an embodiment, a non-transitory computer-readable medium storing computer instructions for performing group handover in a wireless network, that when executed by one or more processors, cause the one or more processors to perform receiving, from a source base station, a RRC message comprising a PDCP PDU for a remote UE. The PDCP PDU is encapsulated as a field in an RRC message formulated by an RRC layer of a context for the relay UE. The instructions, when executed by the one or more processors, also cause the one or more processors to perform extracting the PDCP PDU from the RRC message. The instructions, when executed by the one or more processors, also cause the one or more processors to perform passing the PDCP PDU to an uppermost layer of a short range link protocol stack on a short range link that serves the remote UE.

Optionally, in any of the preceding aspects, the method or programming includes transmitting the RRC message to the relay UE.

Optionally, in any of the preceding aspects, the network component includes one of an eNB or a gNB.

Optionally, in any of the preceding aspects, the remote UE is a WD.

Optionally, in any of the preceding aspects, the RRC message comprises a transparent container.

Optionally, in any of the preceding aspects, the relay UE indicates to the remote UE that the PDCP PDU comprises a mobility command for the remote UE.

Optionally, in any of the preceding aspects, the method or programming further includes suspending forwarding of additional PDCP PDUs to the remote UE; performing a handover by the relay UE; and resuming forwarding of the additional PDCP PDUs to the remote UE upon completion of the handover by the relay UE.

Optionally, in any of the preceding aspects, the method or programming further includes receiving a handover complete message from the remote UE and forwarding the handover complete message to a target base station.

An advantage of an embodiment is the enablement of group handovers. A further advantage of an embodiment is that the handover command for each remote UE is a complete RRC message, encrypted according to the security configuration of that remote UE. A further advantage of an embodiment is that these already encrypted messages are delivered to the relay UE at the same time as relay UE's own handover command.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a passing unit/module, an encapsulating unit/module, and/or an extracting unit/module. The respective units/modules may be hardware, software, or a combination thereof. For instance, one or more of the units/modules may be an integrated circuit, such as field programmable gate arrays (FPGAs) or application-specific integrated circuits (ASICs).

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

While aspects have been described with reference to illustrative embodiments, this description is not intended to be construed in a limiting sense. Various modifications and combinations of the illustrative embodiments, as well as other embodiments, will be apparent to persons skilled in the art upon reference to the description. It is therefore intended that the appended claims encompass any such modifications or embodiments.

What is claimed is:

1. A method for group handover, comprising:
receiving, by a serving base station from a target base station in a wireless network, a group handover mobility command, the group handover mobility command comprising a relay user equipment (UE) configuration corresponding to a relay UE and a remote UE configuration corresponding to a remote UE served by the relay UE;
processing, by the serving base station, the remote UE configuration in a packet data convergence protocol (PDCP) layer of a context for the remote UE to generate a PDCP Protocol Data Unit (PDU);
encapsulating, by the serving base station, the PDCP PDU as a field in a radio resource control (RRC) message;
packaging, by the serving base station, the relay UE configuration in the RRC message separately from the PDCP PDU; and
transmitting, by the serving base station to the relay UE, the RRC message.

2. The method of claim 1, wherein the serving base station comprises an eNodeB (eNB) or a gNodeB (gNB).

3. The method of claim 1, wherein the remote UE is a wearable device (WD).

4. The method of claim 1, wherein the processing the remote UE configuration further comprises encrypting the remote UE configuration with a security context belonging to the remote UE.

5. The method of claim 1, wherein the receiving the group handover mobility command further comprises receiving the group handover mobility command in an RRC PDU message.

6. The method of claim 1, further comprising:
receiving, by the serving base station from the relay UE, a channel quality measurement of the wireless network; and
transmitting, by the serving base station to the target base station, a group handover request for the remote UE served by the relay UE.

7. The method of claim 1, further comprising encrypting the RRC message using a security key associated with the relay UE.

8. The method of claim 1, further comprising:
receiving, by the serving base station from a second target base station in the wireless network, a second group handover mobility command, the second group handover mobility command comprising a second relay UE configuration corresponding to the relay UE and remote UE configurations corresponding to remote UEs served by the relay UE;
processing, by the serving base station, each remote UE configuration in the PDCP layer of a context for each remote UE to generate a corresponding PDCP PDU;
encapsulating, by the serving base station, each PDCP PDU as a field in a second RRC message;
packaging, by the serving base station, the second relay UE configuration in the second RRC message separately from each PDCP PDU; and
transmitting, by the serving base station to the relay UE, the second RRC message.

9. A method for group handover, comprising:
receiving, by a relay user equipment (UE) from a source base station in a wireless network, a radio resource control (RRC) message, the RRC message comprising a relay UE configuration for the relay UE and a packet data convergence protocol (PDCP) protocol data unit (PDU) comprising a remote UE configuration for a remote UE served by the relay UE, the PDCP PDU encapsulated as a separate field from the relay UE configuration in the RRC message;
extracting, by the relay UE, the PDCP PDU from the RRC message; and
passing, by the relay UE, the PDCP PDU to an uppermost layer of a short range link protocol stack on a short range link that serves the remote UE.

10. The method of claim 9, further comprising indicating, by the relay UE to the remote UE that the PDCP PDU comprises a mobility command for the remote UE.

11. The method of claim 9, further comprising:
suspending, by the relay UE, forwarding of additional PDCP PDUs to the remote UE;
performing, by the relay UE, a handover by the relay UE; and
resuming, by the relay UE, forwarding of the additional PDCP PDUs to the remote UE upon completion of the handover by the relay UE.

12. The method of claim 9, further comprising:
receiving, by the relay UE, a handover complete message from the remote UE; and
forwarding, by the relay UE, the handover complete message to a target base station.

13. The method of claim 9, further comprising decrypting the RRC message using a security associated with the relay UE.

14. The method of claim 9, further comprising forwarding, by the relay UE to the remote UE, the PDCP PDU.

15. The method of claim 9, further comprising encrypting, by the relay UE, the PDCP PDU in accordance with a security key associated with the remote UE.

16. The method of claim 9, further comprising:
receiving, by the relay UE from a second base station in the wireless network, a second RRC message, the second RRC message comprising a second relay UE configuration for the relay UE and a plurality of PDCP PDUs, each PDCP PDU encapsulated in a separate field from the second relay UE configuration in the second RRC message, each PDCP PDU comprising a remote UE configuration for a respective remote UE served by the relay UE;
extracting, by the relay UE, each PDCP PDU from the second RRC message;
passing, by the relay UE, each PDCP PDU to an uppermost layer of a short range link protocol stack on a short range link that serves each respective remote UE; and
forwarding, by the relay UE to each remote UE, a corresponding one of the plurality of PDCP PDUs.

17. A serving base station for group handover, comprising:
a transmitter;
a receiver;
a non-transitory memory storage comprising instructions; and
a processor in communication with the transmitter, the receiver, and the non-transitory memory storage, wherein the processor executes instructions to:
receive a group handover mobility command from a target base station in a wireless network, the group handover mobility command comprising a relay user equipment (UE) configuration corresponding to a relay UE and a remote UE configuration corresponding to a remote UE served by the relay UE;
process the remote UE configuration in a packet data convergence protocol (PDCP) layer of a context for the remote UE to generate a PDCP Protocol Data Unit (PDU);
encapsulate the PDCP PDU as a field in a radio resource control (RRC) message;
package the relay UE configuration in the RRC message separately from the PDCP PDU; and
transmit the RRC message to the relay UE.

18. The serving base station of claim 17, wherein the serving base station comprises an eNodeB (eNB) or a gNodeB (gNB).

19. A relay user equipment (UE) for group handover, comprising:
a transmitter;
a receiver;
a non-transitory memory storage comprising instructions; and
a processor in communication with the transmitter, the receiver, and the non-transitory memory storage, wherein the processor executes instructions to:
receive a radio resource control (RRC) message from a source base station in a wireless network, the RRC message comprising a relay UE configuration for the relay UE and a packet data convergence protocol (PDCP) protocol data unit (PDU) comprising a remote UE configuration for a remote UE served by the relay UE, the PDCP PDU encapsulated as a separate field from the relay UE configuration in the RRC message;

extract the PDCP PDU from the RRC message; and pass the PDCP PDU to an uppermost layer of a short range link protocol stack on a short range link that serves the remote UE.

20. The relay UE of claim 19, wherein the processor executes instructions to indicate to the remote UE that the PDCP PDU comprises a mobility command for the remote UE.

21. The relay UE of claim 19, wherein the processor executes instructions to:

suspend forwarding of additional PDCP PDUs to the remote UE;

perform a handover by the relay UE; and resume forwarding of the additional PDCP PDUs to the remote UE upon completion of the handover by the relay UE.

22. The relay UE of claim 19, wherein the processor executes instructions to:

receive a handover complete message from the remote UE; and forward the handover complete message to a target base station.

23. A non-transitory computer-readable media storing computer instructions for instructing a relay user equipment (UE) to perform a group handover, that when executed by one or more processors, cause the one or more processors to perform the steps of:

receive, by a serving base station from a target base station in a wireless network, a group handover mobility command, the group handover mobility command comprising a relay user equipment (UE) configuration corresponding to a relay UE and a remote UE configuration corresponding to a remote UE served by the relay UE;

process, by the serving base station, the remote UE configuration in a packet data convergence protocol (PDCP) layer of a context for the remote UE to generate a PDCP Protocol Data Unit (PDU);

encapsulate, by the serving base station, the PDCP PDU as a field in a radio resource control (RRC) message; and Package, by the serving base station, the relay UE configuration in the RRC message separately from the PDCP PDU; and transmit, by the serving base station, the RRC message to the relay UE.

24. The non-transitory computer-readable media of claim 23, wherein the serving base station comprises an eNodeB (eNB) or a gNodeB (gNB).

25. A non-transitory computer-readable media storing computer instructions for performing group handover, that when executed by one or more processors, cause the one or more processors to perform the steps of:

receive, by a relay user equipment (UE) from a source base station in a wireless network, a radio resource control (RRC) message, the RRC message comprising a relay UE configuration for the relay UE and a packet data convergence protocol (PDCP) protocol data unit (PDU) comprising a remote UE configuration for a remote UE served by the relay UE, the PDCP PDU encapsulated as a separate field from the relay UE configuration in the RRC message;

extract, by the relay UE, the PDCP PDU from the RRC message; and pass the PDCP PDU to an uppermost layer of a short range link protocol stack on a short range link that serves the remote UE.

26. The non-transitory computer-readable media of claim 25, wherein the computer instructions, when executed by the one or more processors further cause the one or more processors to perform the step of indicating to the remote UE that the PDCP PDU comprises a mobility command for the remote UE.

27. The non-transitory computer-readable media of claim 25, wherein the computer instructions, when executed by the one or more processors further cause the one or more processors to perform the steps of:

suspend, by the relay UE, forwarding of additional PDCP PDUs to the remote UE;

perform, by the relay UE, a handover by the relay UE; and resume, by the relay UE, forwarding of the additional PDCP PDUs to the remote UE upon completion of the handover by the relay UE.

28. The non-transitory computer-readable media of claim 25, wherein the computer instructions, when executed by the one or more processors further cause the one or more processors to perform the steps of:

receive, by the relay UE, a handover complete message from the remote UE; and forward, by the relay UE, the handover complete message to a target base station.

* * * * *

UNITED STATES PATENT AND TRADEMARK OFFICE
CERTIFICATE OF CORRECTION

PATENT NO. : 10,149,213 B2
APPLICATION NO. : 15/676158
DATED : December 4, 2018
INVENTOR(S) : Nathan Edward Tenny Page 1 of 1

It is certified that error appears in the above-identified patent and that said Letters Patent is hereby corrected as shown below:

In the Claims

In Column 15, Line 46, Claim 23, delete "Package" and insert --package--.

Signed and Sealed this
Nineteenth Day of March, 2019

Andrei Iancu
*Director of the United States Patent and Trademark Office*